(12) United States Patent
Yamazaki et al.

(10) Patent No.: US 9,033,519 B2
(45) Date of Patent: May 19, 2015

(54) PROJECTION DEVICE HAVING AN OPEN/CLOSE UNIT PROVIDED WITH A PROJECTION LENS

(75) Inventors: Tatsuya Yamazaki, Tokyo (JP); Katsumi Ikuta, Tokyo (JP); Atsuko Kashiwagi, Kanagawa (JP); Nobutaka Saitoh, Kanagawa (JP); Nobuhito Ebine, Tokyo (JP)

(73) Assignee: SONY CORPORATION, Tokyo (JP)

( * ) Notice: Subject to any disclaimer, the term of this patent is extended or adjusted under 35 U.S.C. 154(b) by 490 days.

(21) Appl. No.: 13/235,826

(22) Filed: Sep. 19, 2011

(65) Prior Publication Data

US 2012/0113401 A1   May 10, 2012

(30) Foreign Application Priority Data

Nov. 10, 2010 (JP) ................. 2010-251674

(51) Int. Cl.
| | | |
|---|---|---|
| *G01B 21/14* | (2006.01) | |
| *G01B 3/00* | (2006.01) | |
| *H04N 9/31* | (2006.01) | |
| *H04N 5/225* | (2006.01) | |

(52) U.S. Cl.
CPC ........... *H04N 9/3176* (2013.01); *H04N 5/2251* (2013.01)

(58) Field of Classification Search
CPC   H04M 1/021; H04M 1/0227; H04M 2250/20
USPC .................. 353/101; 348/340, 373, 378, 375
See application file for complete search history.

(56) References Cited

U.S. PATENT DOCUMENTS

| | | | |
|---|---|---|---|
| 7,500,758 B1 * | 3/2009 | Adachi et al. ................. | 353/101 |
| 2003/0174120 A1 | 9/2003 | Weiner et al. | |
| 2008/0049192 A1 * | 2/2008 | Nozaki et al. .................. | 353/25 |
| 2009/0141245 A1 | 6/2009 | Nozaki et al. | |
| 2009/0247235 A1 | 10/2009 | Okano | |

FOREIGN PATENT DOCUMENTS

| | | |
|---|---|---|
| EP | 1 793 270 A1 | 6/2007 |
| EP | 1 903 387 A1 | 3/2008 |
| JP | 2005-236746 | 9/2005 |
| JP | 2006-078752 | 3/2006 |
| JP | 2006-080875 | 3/2006 |

(Continued)

OTHER PUBLICATIONS

Extended Search Report issued Apr. 10, 2012 in European Patent Application No. 11187498.8-1228.

(Continued)

*Primary Examiner* — Francis M Legasse, Jr.
(74) *Attorney, Agent, or Firm* — Oblon, McClelland, Maier & Neustadt, L.L.P.

(57) ABSTRACT

There is provided a projection device including a device main body, and an open/close unit having a projection lens, the open/close unit being connected to the device main body in a manner openable and closable about an open/close axis formed in a vertical direction of the device main body and in a manner rotatable about a rotation axis that is perpendicular to the open/close axis. The projection lens is, in a closed state in which the open/close unit is closed with respect to the device main body such that the projection lens faces outward, provided on an upper side of the rotation axis of the open/close unit.

7 Claims, 12 Drawing Sheets

(56) References Cited

FOREIGN PATENT DOCUMENTS

| JP | 2007-096542 | 4/2007 |
|---|---|---|
| JP | 2007-219225 | 8/2007 |
| JP | 2009-206588 | 10/2009 |
| JP | 2009-244322 | 10/2009 |
| JP | 2010-114476 | 5/2010 |
| JP | 2010-177879 | 8/2010 |
| JP | 2010-252285 | 11/2010 |

OTHER PUBLICATIONS

U.S. Appl. No. 13/269,751, filed Oct. 10, 2011, Yamazaki, et al.
U.S. Appl. No. 13/247,561, filed Sep. 28, 2011, Yamazaki, et al.
Japanese Office Action issued in Japanese Application No. 2010-251674 on Apr. 8, 2014.

* cited by examiner

PROJECTION DEVICE HAVING AN OPEN/CLOSE UNIT PROVIDED WITH A PROJECTION LENS

BACKGROUND

The present disclosure relates to a projection device.

In the related art, an imaging device is mounted with a liquid crystal panel, with which a user is able to check content such as a moving image or a still image captured by the imaging device by viewing a display of the liquid crystal panel. In addition, if the imaging device is connected to a projection device, the user would be able to check content on a large screen. Note that a projection device is described in, for example, JP 2007-219225A.

There has also been proposed mounting a projector module on an imaging device. According to such an imaging device, a moving image and the like can be projected immediately after an imaging process without the need for the imaging device to be connected to a projection device.

SUMMARY

However, as the imaging device of the related art has a projector module provided near an imaging unit, heat generated in the projector module during projection would propagate to the imaging unit, which makes it difficult to start imaging immediately after the projection. In addition, with the imaging device of the related art, it would be difficult to adjust the projection direction without moving the main body of imaging device as the relationship between the imaging direction and the projection direction is fixed. Further, it is also conceivable that when the imaging device is placed on a desk or a floor, the bottom of an image projected onto a wall may be displayed on the desk or the floor depending on the mount position of the projector module.

In light of the foregoing, it is desirable to provide a novel and improved projection device that can improve the usability for a user.

According to an embodiment of the present disclosure, there is provided a projection device including a device main body, and an open/close unit having a projection lens, the open/close unit being connected to the device main body in a manner openable and closable about an open/close axis formed in a vertical direction of the device main body and in a manner rotatable about a rotation axis that is perpendicular to the open/close axis. The projection lens is, in a closed state in which the open/close unit is closed with respect to the device main body such that the projection lens faces outward, located on an upper side of the rotation axis of the open/close unit.

The device main body may include an imaging unit, and a connecting portion that connects the open/close unit and the device main body. The connecting portion may be located on a side of a subject in an optical axis direction of the imaging unit.

The projection lens may be provided on a side far from the connecting portion on a direction in which the rotation axis of the open/close unit is formed.

The projection device may further include a projection unit including the projection lens, and the projection unit may be configured to, in a state in which the open/close unit is opened without rotation from the closed state, project an image in a direction toward the upper side of the device main body.

The projection device may further include a detection unit configured to detect a connection state of the open/close unit with respect to the device main body, and a projection control unit configured to control whether or not to cause the projection unit to project an image in accordance with a detection result obtained by the detection unit.

The projection control unit may, when the detection unit has detected a connection state in which the open/close unit is closed with respect to the device main body such that the projection lens faces inward, control the projection unit such that the projection unit does not project an image.

The projection control unit may, when the detection unit has detected a connection state in which a rotation angle of the open/close unit is outside a predetermined range, controls the projection unit such that the projection unit does not project an image.

As described above, according to the present disclosure, the usability of an imaging device for a user can be improved.

DETAILED DESCRIPTION OF THE EMBODIMENTS

Figure 1:
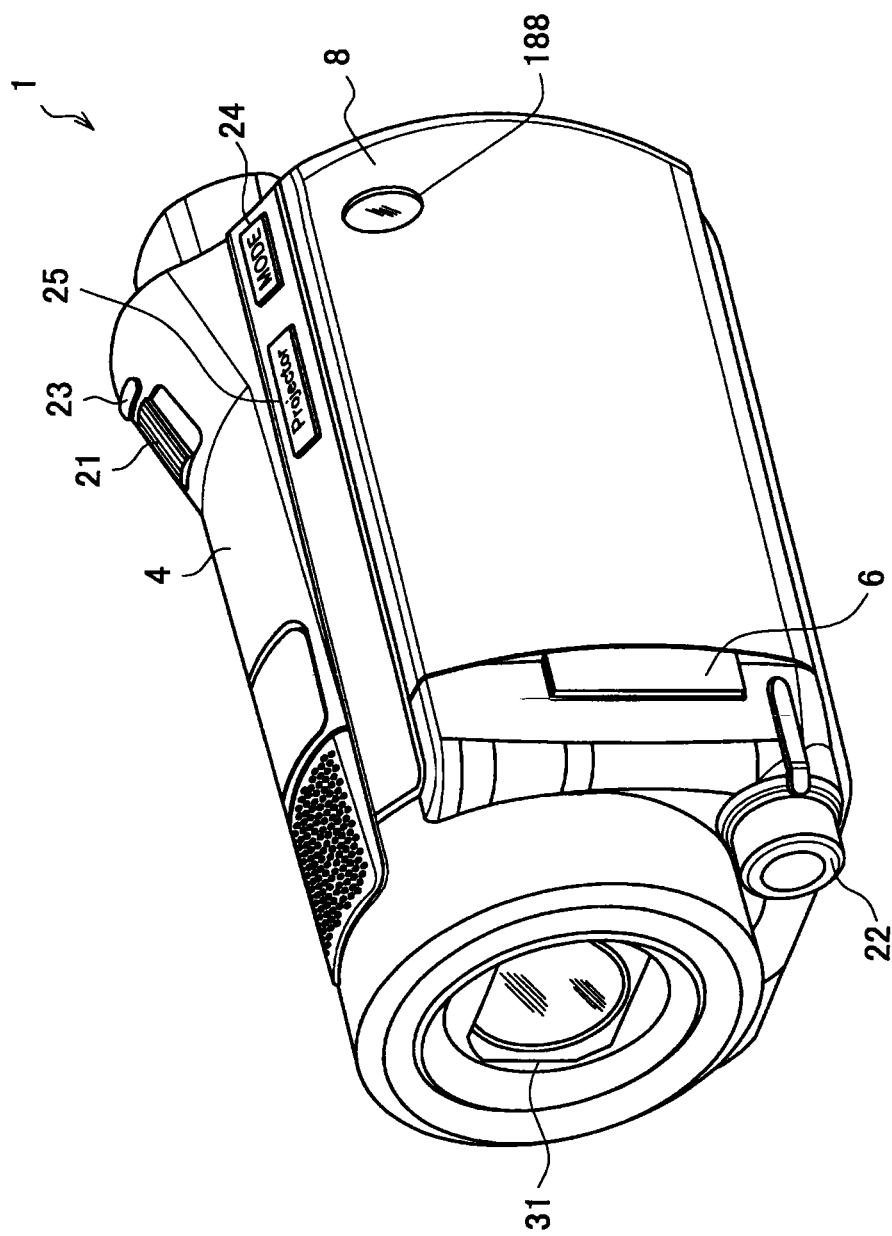
FIG. 1 is a perspective view showing the appearance of an imaging device in accordance with an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, a plurality of structural elements that have substantially the same function and structure and are denoted by identical reference numerals may be followed by different alphabets so that they can be easily distinguished. However, when there is no need to particularly distinguish between each of the plurality of structural elements that have substantially the same function and structure, only reference numerals will be assigned.

The "DETAILED DESCRIPTION OF THE EMBODIMENTS" will be described in accordance with the following order.

1. Basic Configuration of Imaging Device in accordance with Embodiment of the Present Disclosure
2. Mount Position of Projection Lens
3. Function of Imaging Device in accordance with Embodiment of the Present Disclosure
4. Operation of Imaging Device in accordance with Embodiment of the Present Disclosure
    4-1. First Operation Example
    4-2. Second Operation Example
5. Conclusion <1. Basic Configuration of Imaging Device in Accordance with Embodiment of the Present Disclosure>

Figure 2:
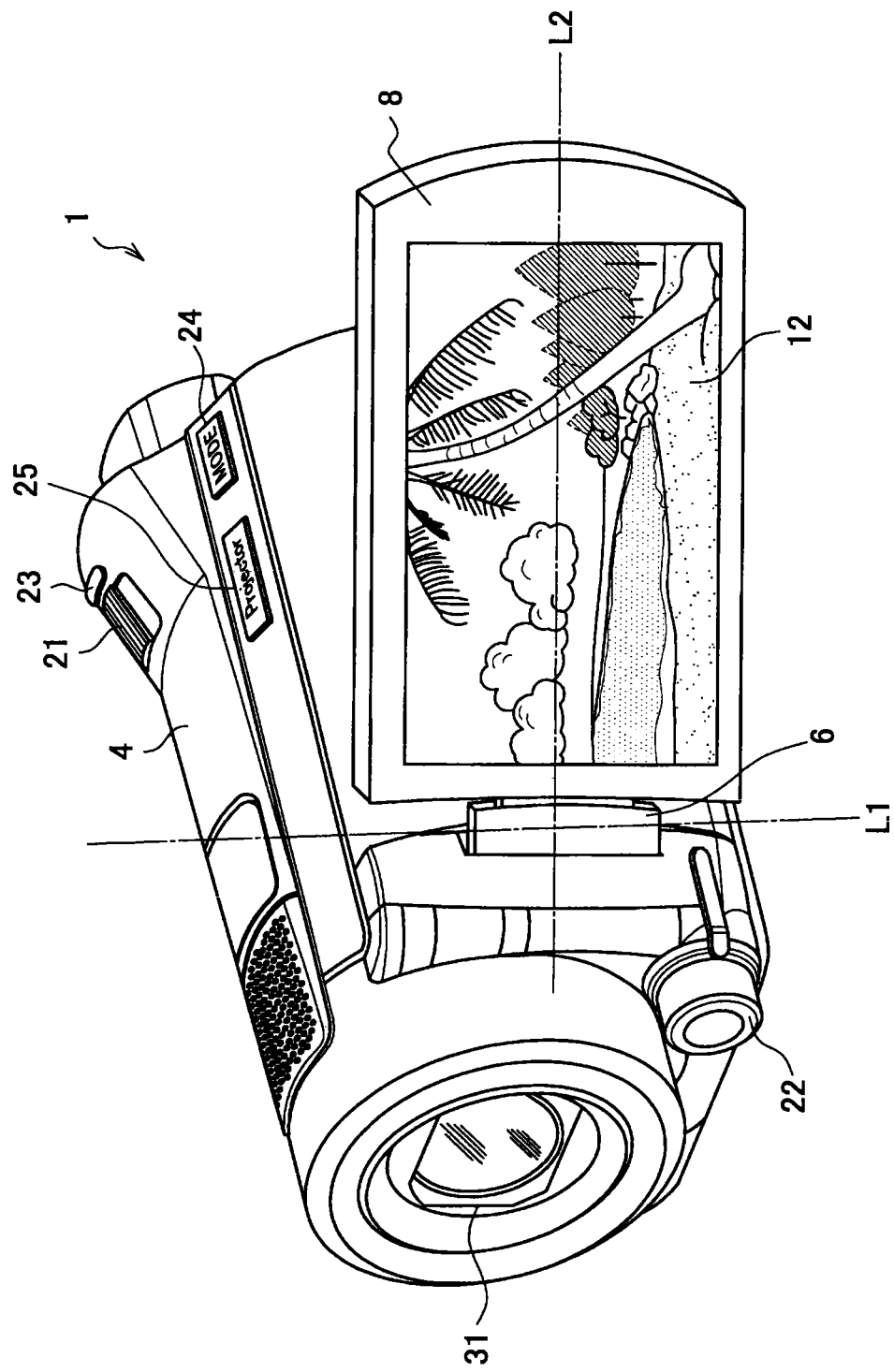
FIG. 2 is a perspective view showing the appearance of an imaging device in accordance with an embodiment of the present disclosure.

FIGS. 1 and 2 are perspective views each showing the appearance of an imaging device 1 in accordance with an embodiment of the present disclosure. As shown in FIG. 1, the imaging device 1 includes a main body 4, a hinge mechanism 6, and an open/close unit 8. Although FIGS. 1 and 2 each show the imaging device 1 (video camera) as an example of a projection device, the projection device is not limited thereto. For example, the projection device can be an information processing device such as a PC (Personal Computer), a PDA (Personal Digital Assistant), a home game machine, a portable phone, a PHS (Personal Handyphone System), a portable music playback device, a portable image processing device, or a portable game machine.

The main body 4 of the imaging device 1 includes a zoom operation unit 21, a manual operation unit 22, a still image capturing operation unit 23, a mode operation unit 24, a projection switching operation unit 25, and an imaging optical unit 31.

The imaging optical unit 31 is an imaging unit that includes a shooting lens for condensing light emitted from a subject and a zoom lens, and that forms an image of the subject at a signal conversion unit such as a CCD (Charge Coupled Device) or a CMOS (Complementary Metal Oxide Semiconductor). When an image of the subject is formed at the signal conversion unit, the image of the subject is converted into an electrical image signal by the signal conversion unit.

The zoom operation unit 21 receives a user's operation for changing the focal length of the imaging optical unit 31. The zoom operation unit 21 includes a lever that can be tiled to a wide position or a telephoto position as shown in FIG. 1. In this case, the imaging optical unit 31 reduces the focal length (shrinks the image of the subject) when the lever is tilted to the wide position, and increases the focal length (enlarges the image of the subject) when the lever is tilted to the telephoto position.

The manual operation unit 22 receives a user's operation for focusing the imaging optical unit 31. The manual operation unit 22 includes a dial that can rotate clockwise or counterclockwise as shown in FIG. 1, for example. In this case, the imaging optical unit 31 adjusts the focal position in accordance with the rotation direction and the rotation amount of the dial.

The still image capturing operation unit 23 receives a user's operation for capturing a still image. The still image capturing operation unit 23 includes a pressing button as shown in FIG. 1, for example. In this case, the imaging device 1 captures a still image in accordance with pressure applied to the button, thereby acquiring image data of the still image.

The mode operation unit 24 receives a user's operation for switching the operation mode of the imaging device 1. Herein, operation modes of the imaging device 1 are broadly divided into a shooting mode and a playback mode, for example. The mode operation unit 24 includes a pressing button as shown in FIG. 1, for example. In this case, the imaging device 1 switches the operation mode between the shooting mode and the playback mode in accordance with pressure applied to the button.

Note that the shooting mode is an operation mode for capturing an image of a subject by operating the imaging optical unit 31, the signal conversion unit, and the like. Meanwhile, the playback mode is an operation mode for playing back the image data acquired in the shooting mode, for example. The details of such operation modes are described below with reference to FIG. 3 to FIG. 5.

The projection switching operation unit 25 receives a user's operation for switching whether or not to project a screen, which has been generated by the imaging device 1, from a projection lens 188. For example, the projection switching operation unit 25 includes a pressing button as shown in FIG. 1, for example. In this case, the imaging device 1 switches whether or not to project a screen from the projection lens 188 in accordance with pressure applied to the button. Note that while a screen is projected from the projection lens 188, the touch panel 12 can display the same screen as the projection screen, display a screen that is different from the projection screen, or display no screen.

Described above is the configuration of the main body 4 of the imaging device 1. Next, the configuration of the open/close unit 8 that is connected to the main body 4 via the hinge mechanism 6 (a connecting portion) will be described.

The open/close unit 8 is connected to the main body 4 via the hinge mechanism 6 such that it can open and close about an open/close axis L1, which is formed in the vertical direction of the main body 4, and can rotate about a rotation axis L2, which is perpendicular to the open/close axis L1, shown in FIG. 2. FIG. 1 shows the basic storage state (a closed state) in which the open/close unit 8 is closed with respect to the main body 4 such that the projection lens 188 faces outward, while FIG. 2 shows a state in which the open/close unit 8 is rotated about the open/close axis L1 so that the open/close unit 8 is open with respect to the main body 4.

Such an open/close unit 8 has on one surface thereof a projection lens 188 as shown in FIG. 1 and has on the other surface thereof the touch panel 12 as shown in FIG. 2.

The touch panel 12 is an example of an operation display unit having a display function and an operation detection function. The touch panel 12 can display an image of a subject obtained by focusing light with the imaging optical unit 31 in the shooting mode, and can display an index screen, a playback screen, or the like described below in the playback mode. In addition, the user is able to input various instructions or information to the imaging device 1 by operating the touch panel 12.

The projection lens 188 is a constituent element of a projector module (a projection unit) that projects a screen generated by the imaging device 1. The projector module can, in response to a user's operation on the projection switching operation unit 25, project an index screen, a playback screen, or the like described below, for example. A configuration example of the projector module is described below with reference to FIG. 9.

Described above is the appearance/configuration of the imaging device 1 in accordance with an embodiment of the present disclosure. Next, the shooting mode and the playback mode, which are the operation modes of the imaging device 1, will be described.

Figure 3:
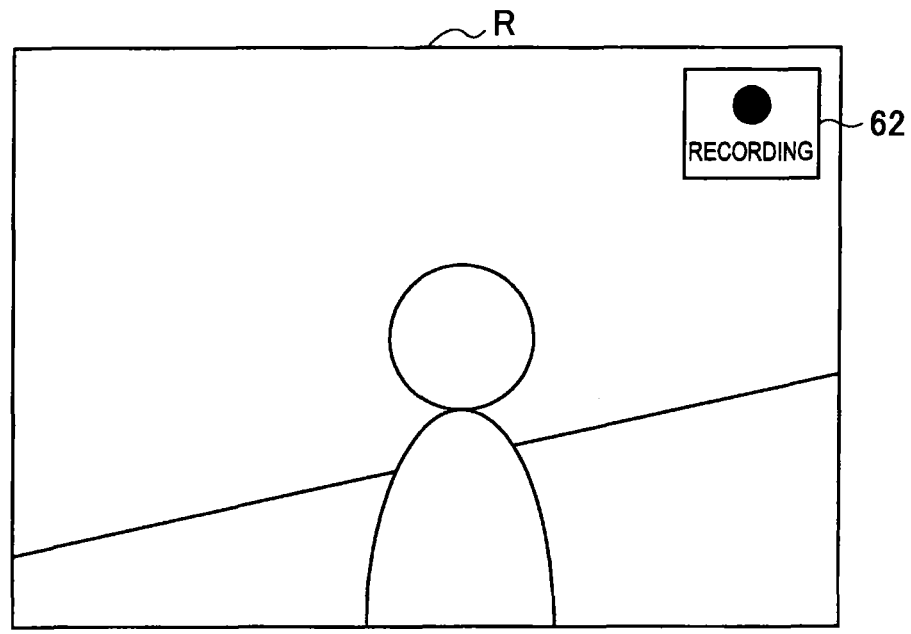
FIG. 3 is an explanatory diagram showing a specific example of an imaging screen.

The shooting mode is an operation mode for capturing an image of a subject by operating the imaging optical unit 31, the signal conversion unit, and the like. In this shooting mode, an imaging screen R of a subject obtained by the imaging optical unit 31 is displayed on the touch panel 12 as shown in FIG. 3. Further, while the imaging screen R is being recorded, a recording mark 62 is added to the imaging screen R as shown in FIG. 3.

Note that when the still image capturing operation unit 24 is pressed by the user in the shooting mode, the imaging device 1 captures a still image of the subject to acquire image data of the still image.

Then, when the mode operation unit 24 is pressed by the user in the shooting mode, the imaging device 1 switches the operation mode to the playback mode. The playback mode is an operation mode for playing back content data. Therefore, after switching the operation mode to the playback mode, the imaging device 1 generates an index screen I for the user to select content data to be played back.

Figure 4:
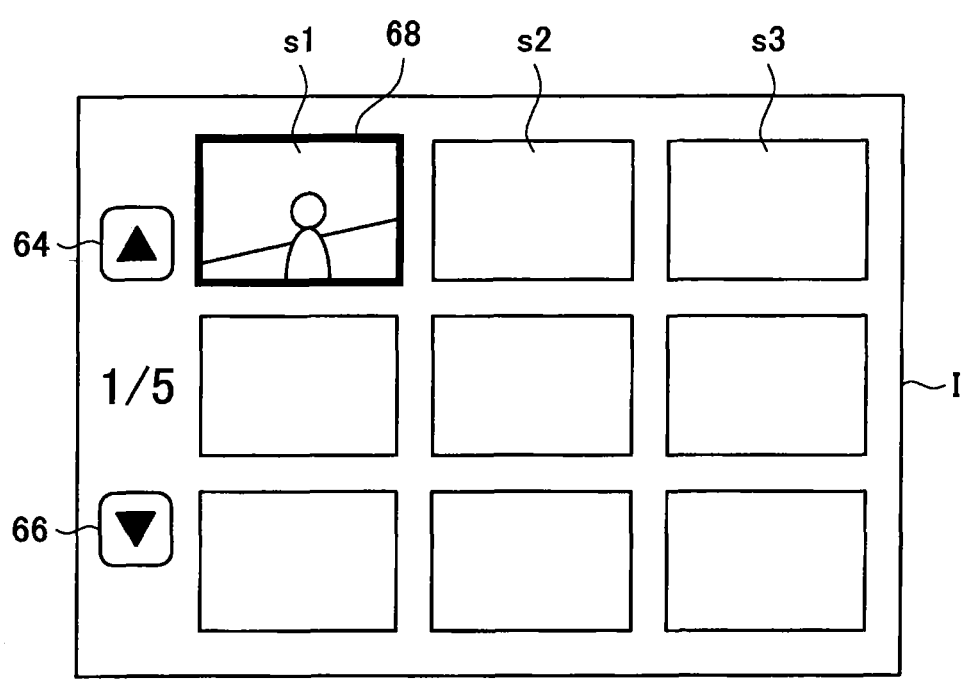
FIG. 4 is an explanatory diagram showing a specific example of an index screen.

FIG. 4 is an explanatory diagram showing a specific example of the index screen I. As shown in FIG. 4, the index screen I includes thumbnails s1, s2, s3, ... each corresponding to a plurality of pieces of content data. Note that the content data can be image data acquired by the imaging device 1 through imaging or image data acquired from the outside. In addition, the data type of the content data is not limited to image data, and the data type of the content data can be audio data, game, software, or the like. In addition, each thumbnail s can be either a still image or a moving image.

The index screen I includes an upward scroll button 64 and a downward scroll button 66. The user is able to scroll on the index screen I in any direction by selecting the upward scroll button 64 or the downward scroll button 66.

In addition, the user is able to select content data to be played back by placing a cursor 68 over a desired thumbnail on the index screen I. Then, when content data to be selected is determined by the user, the imaging device 1 starts playing back the selected content data and generates a playback screen of the content data.

Figure 5:
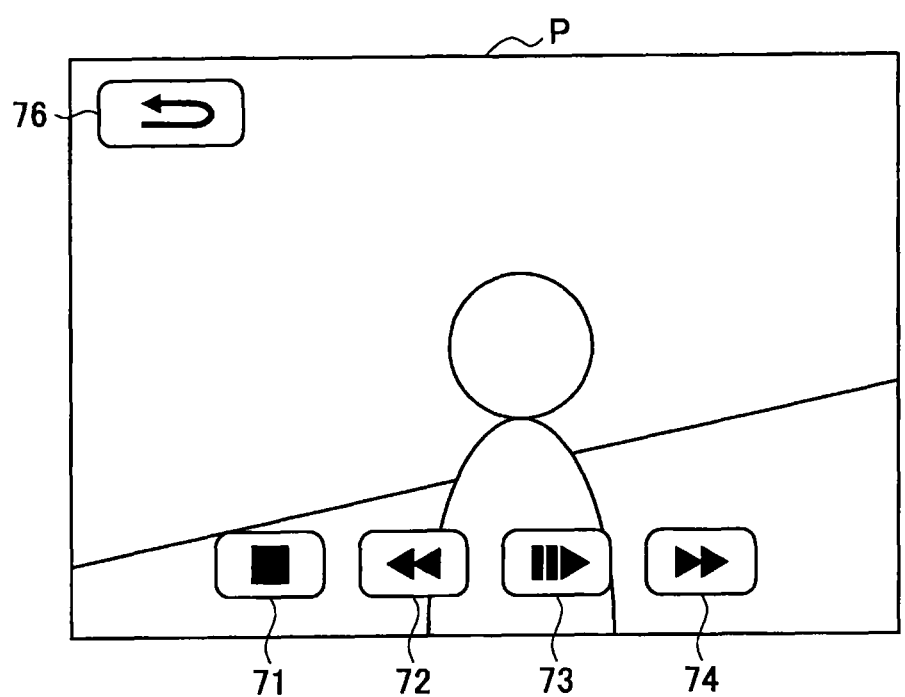
FIG. 5 is an explanatory diagram showing a specific example of a playback screen.

FIG. 5 is an explanatory diagram showing a specific example of the playback screen P of the content data. As shown in FIG. 5, the playback screen P of the content data includes a stop button 71, a fast-rewind button 72, a play/pause button 73, a fast-forward button 74, and a return button 76.

When the stop button 71, the fast-rewind button 72, the play/pause button 73, or the fast-forward button 74 is selected by the user, the imaging device 1 controls playback of the content data in accordance with the selected button. For example, when the stop button 71 is selected by the user, the imaging device 1 stops playback of the content data. In addition, when the return button 76 is selected by the user, the imaging device 1 stops playback of the content data, and generates the index screen I.

Although description has been made above of an example in which switching between the shooting mode and the playback mode is performed in accordance with a user's operation on the mode-operation unit 24, the trigger to switch the mode is not limited thereto. For example, a button for switching the operation mode to the playback mode can be added to the imaging screen R so that the imaging device 1 can, when the button for switching the operation mode to the playback mode is selected by the user, switch the operation mode to the playback mode. Likewise, a button for switching the operation mode to the shooting mode can be added to the index screen I or the playback screen P so that the imaging device 1 can, when the button for switching the operation mode to the shooting mode is selected by the user, switch the operation mode to the shooting mode.

The configuration of the index screen I is not limited to the example shown in FIG. 4. For example, the index screen I can be a screen in which a thumbnail of image data is overlaid on a position associated with the image data on a map (e.g., imaging position), or a screen in which a thumbnail of image data is overlaid on a position associated with the image data on the time axis (e.g., imaging date and time).

In addition, the imaging device 1 in the playback mode can display the aforementioned index screen I or playback screen P on the touch panel 12, and can also project such screen from a projector module 18.

<2. Mount Position of Projection Lens>

Described above with reference to FIGS. 1 to 5 is the basic configuration of the imaging device 1 in accordance with an embodiment of the present disclosure. Next, a point related to the position of the projection lens 188 provided in the imaging device 1 will be described.

(First Point)

Figure 6:
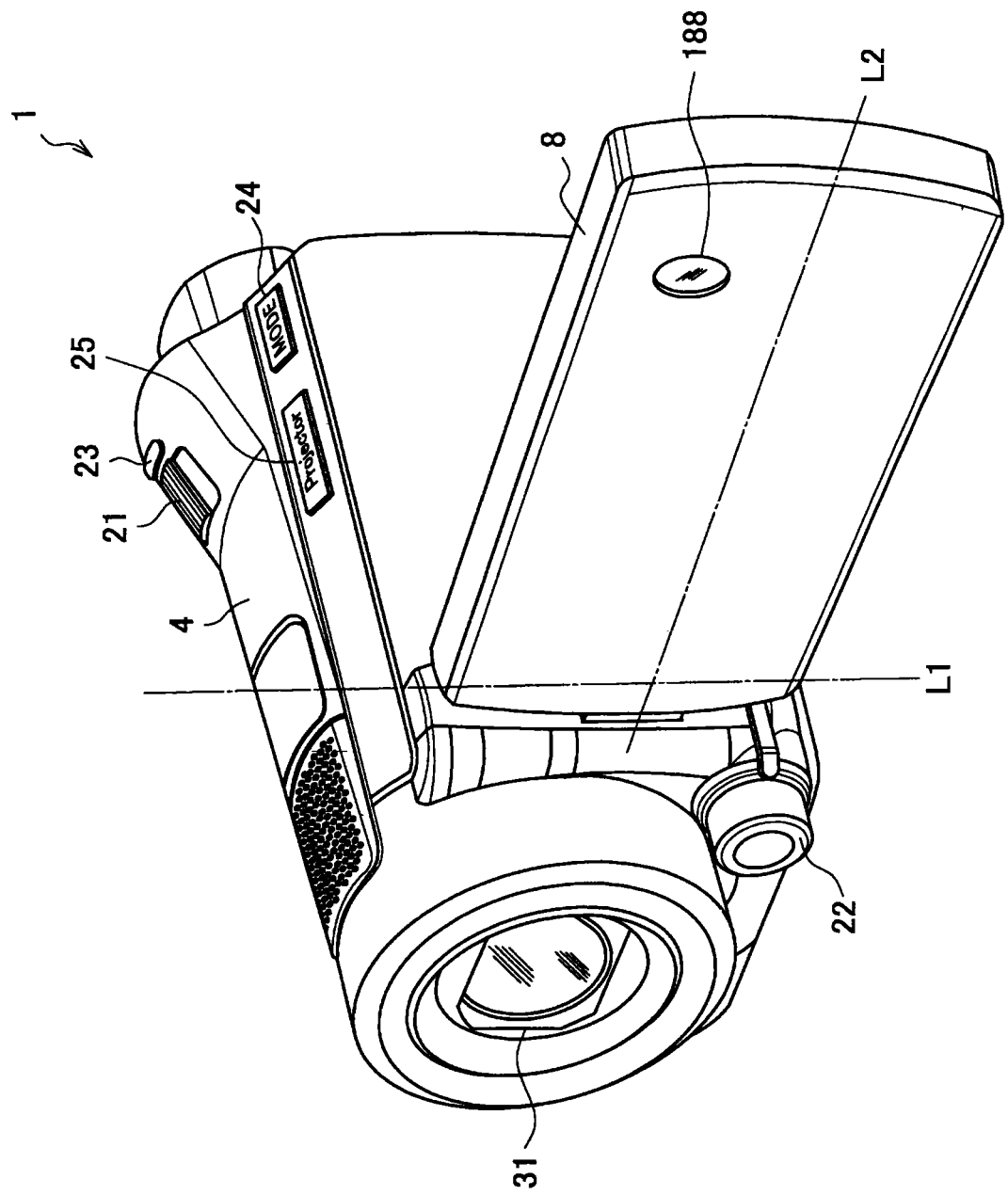
FIG. 6 is an explanatory diagram showing a state in which an open/close unit is open at a right angle to a main body.

FIG. 6 is an explanatory diagram showing a state in which the open/close unit 8 is open at a right angle to the main body 4. As shown in FIG. 6, the projection lens 188 is provided on the open/close unit 8. Herein, the open/close unit 8 is connected to the main body 4 such that it can open and close about the open/close axis L1 and can rotate about the rotation axis L2 that is perpendicular to the open/close axis L1. Therefore, the user is able to easily adjust the direction that the projection lens 188 faces, namely, the direction of projection from the projection lens 188 by rotating the open/close unit 8 about the open/close axis L1 or about the rotation axis L2.

(Second Point)

As shown in FIG. 6, the projector module including the projection lens 188 is indirectly connected to the main body 4 having the imaging optical unit 31 via the hinge mechanism 6. Therefore, it is possible to suppress propagation of heat generated in the projector module toward the imaging optical unit 31 during projection. As a result, it is possible to avoid a circumstance that imaging would not be able to be started immediately after projection due to propagation of heat generated in the projector module toward the imaging optical unit 31.

(Third Point)

The projection lens 188 is provided such that it is located on the upper side of the rotation axis L2 in the basic storage state shown in FIG. 1. Hereinafter, the significance of providing the projection lens 188 on the upper side of the rotation axis L2 will be described with reference to FIGS. 7 and 8.

Figure 7:
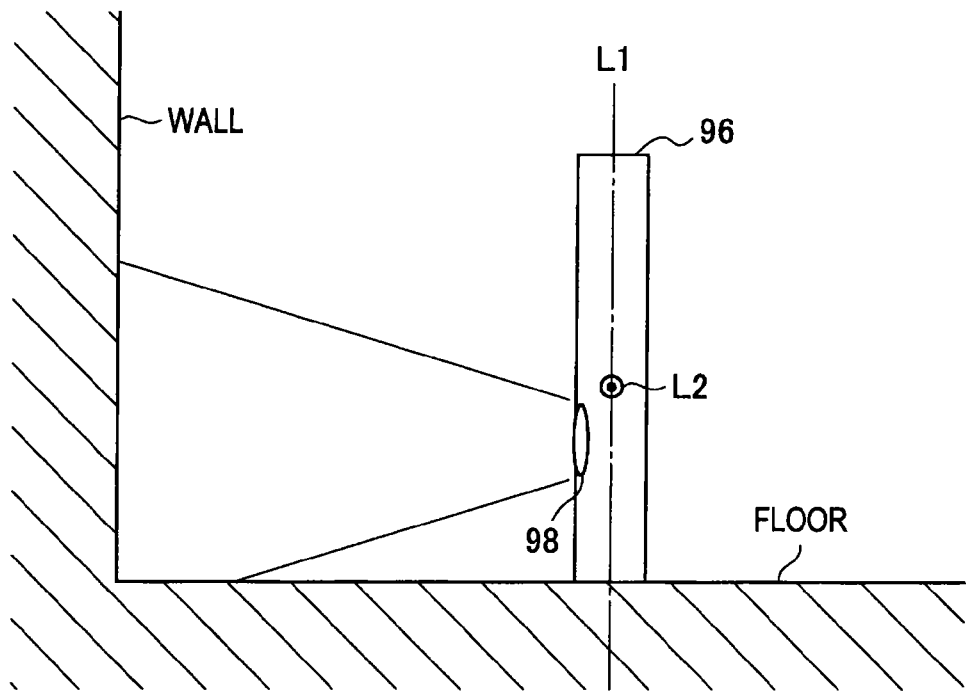
FIG. 7 is an explanatory diagram showing the state of projection from a projection lens provided on an open/close unit in accordance with a comparative example.

FIG. 7 is an explanatory diagram showing the state of projection from a projection lens 98 provided on an open/close unit 96 in accordance with a comparative example. As shown in FIG. 7, on the open/close unit 96 in accordance with the comparative example, the projection lens 98 is provided on the lower side of the rotation axis L2 of the open/close unit 96. Herein, it is considered that a user may cause the imaging device to perform projection while placing the imaging device on a floor or a desk in many cases. Therefore, when the projection lens 98 is provided on the lower side of the rotation axis L2 of the open/close unit 96 like the open/close unit 96 in accordance with the comparative example, a problem would arise that the bottom of an image projected onto a wall from the projection lens 98 may easily be blocked by the desk or the floor as shown in FIG. 7.

Figure 8:
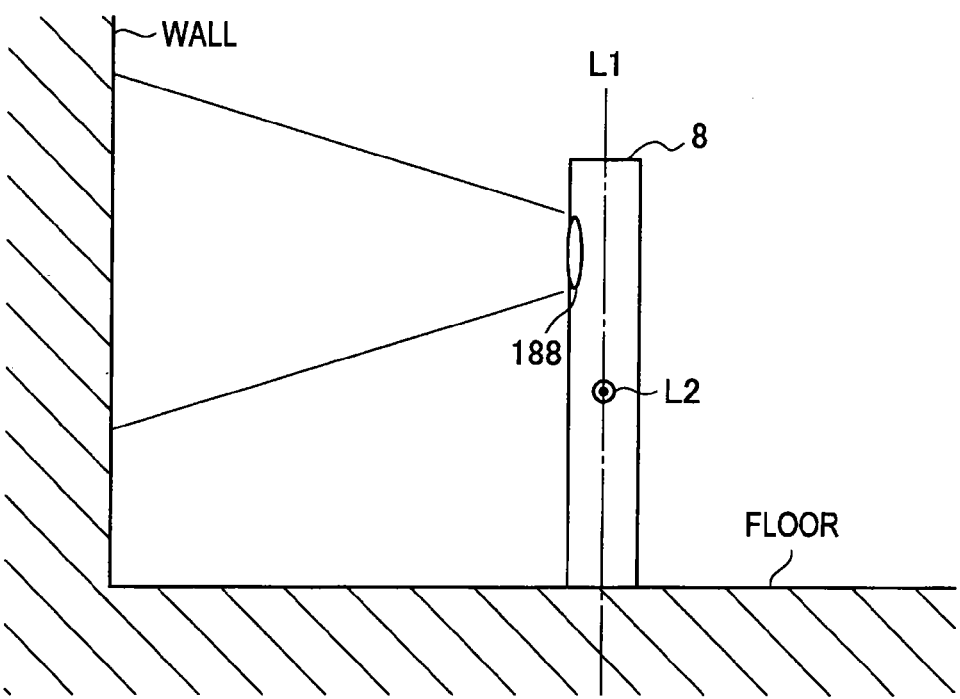
FIG. 8 is an explanatory diagram showing the state of projection from a projection lens 188 provided on an open/close unit 8 in accordance with an embodiment of the present disclosure.

In contrast, in this embodiment, the projection lens 188 is provided such that it is located on the upper side of the rotation axis L2 of the open/close unit 8 in the basic storage state, whereby it is possible to suppress the possibility that the bottom of an image projected onto a wall from the projection lens 188 may be blocked by a desk or a wall as shown in FIG. 8.

(Fourth Point)

If a projector module is constructed such that, in a state in which rotation about the rotation axis L2 is not added in the basic storage state, an image is projected from the projection lens 188 in a direction toward the upper side of the main body 4, the aforementioned problem can be addressed even more effectively. Hereinafter, a configuration example of such a projector module will be described with reference to FIG. 9.

Figure 9:
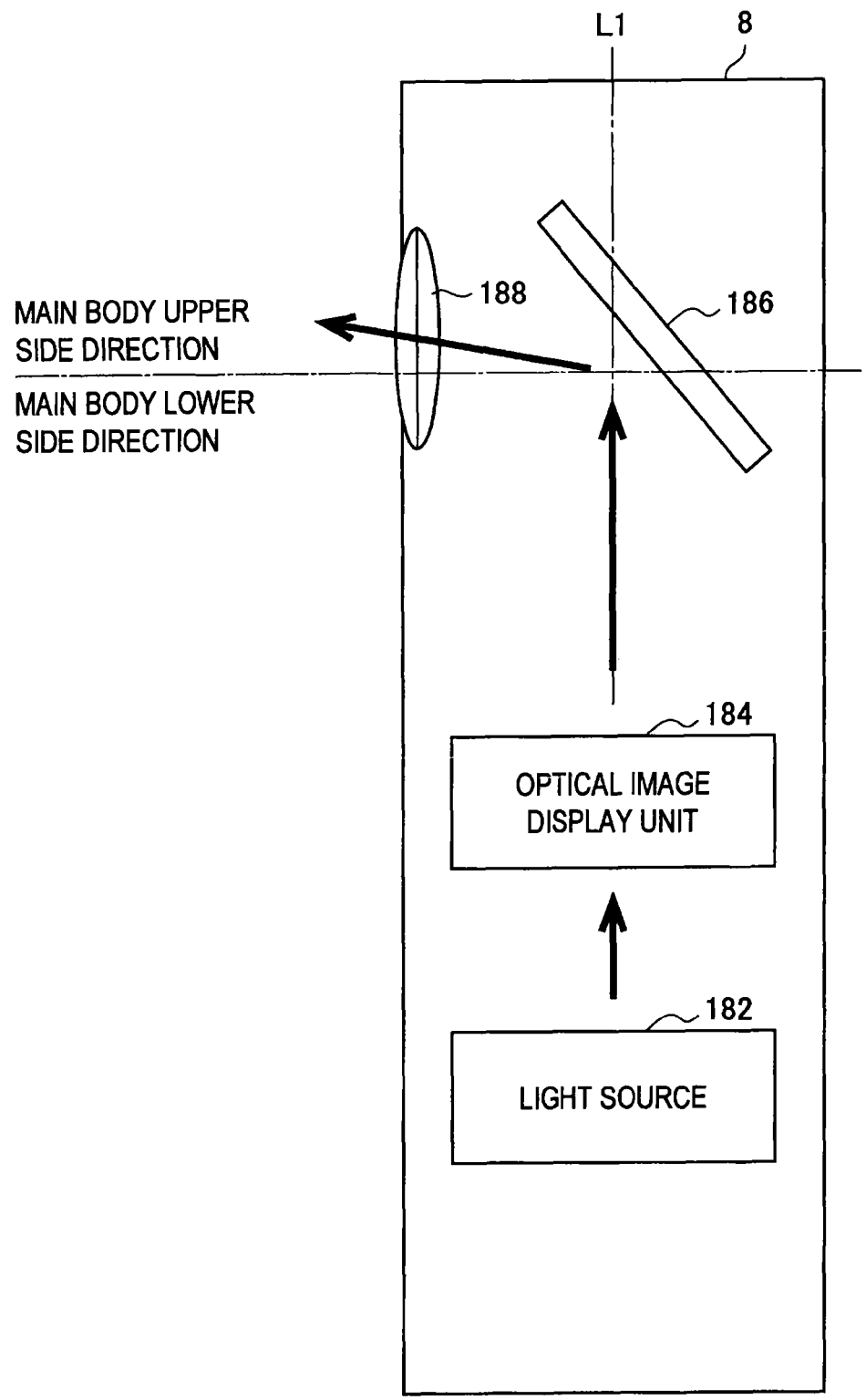
FIG. 9 is an explanatory diagram showing a configuration example of a projector module.

FIG. 9 is an explanatory diagram showing a configuration example of the projector module. As shown in FIG. 9, the projector module includes a light source 182, an optical image display unit 184, a reflecting plate 186, and a projection lens 188.

The light source 182 includes white LED (Light Emitting Diode) that emits white light, and an optical unit that diffuses the light emitted from the white LED and shines the light onto the optical image display unit 184. Although this embodiment mainly describes an example in which the light source 182 includes white LED, the configuration of the light source 182 is not limited thereto. For example, the light source 182 can include a high-pressure mercury lamp.

The optical image display unit 184 is a liquid crystal panel that displays a screen for projection. The screen displayed on the optical image display unit 184 is supplied to the reflecting plate 186 by the light emitted from the light source 182.

The reflecting plate 186 reflects incident light from the optical image display unit 184 toward the projection lens 188. Herein, the reflecting plate 186 has, in a state in which rotation about the rotation axis L2 is not added in the basic storage state, an angle that reflects the incident light in a direction toward the upper side of the main body 4. The projection lens 188 forms an image of the screen reflected by the reflecting plate 186 on a projection plane.

According to the aforementioned configuration of the projector module, it is possible to more effectively suppress the possibility that the bottom of an image projected onto a wall from the projection lens 188 may be blocked by a desk or a floor.

(Fifth Point)

Further, the projection lens 188 is provided on a side far from the hinge mechanism 6 on the direction in which the rotation axis L2 of the open/close unit 8 is formed as shown in FIG. 6. In addition, the hinge mechanism 6 is provided on the side of a subject (front side) of the main body 4 in the optical axis direction of the imaging optical unit 31. According to such a configuration, it is possible to, when an image is projected from the projection lens 188 in a state in which the open/close unit 8 is open as shown in FIG. 6, suppress the possibility that the image projected from the projection lens 188 may be blocked by the main body 4.

<3. Function of Imaging Device in Accordance with Embodiment of the Present Disclosure>

Figure 10:
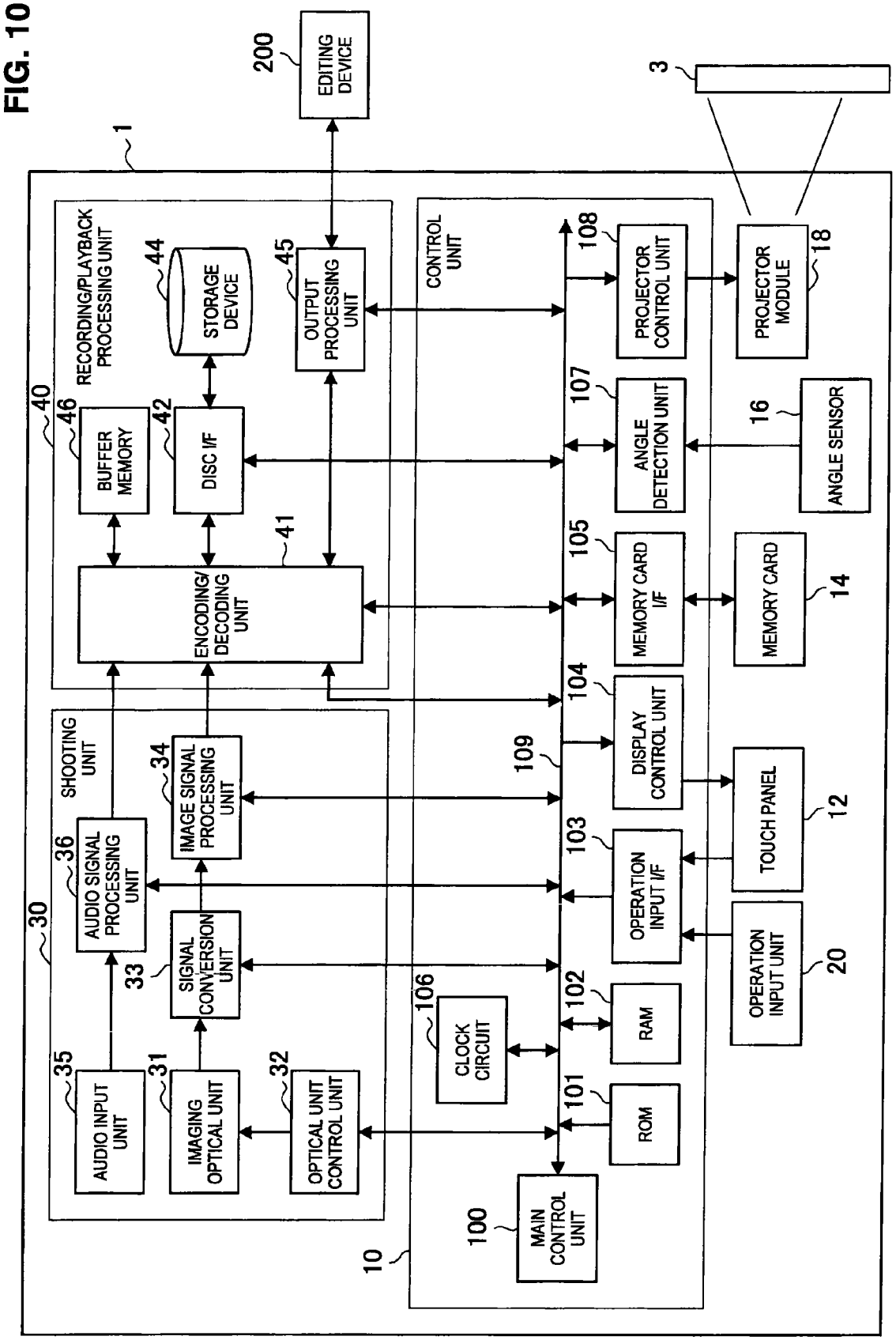
FIG. 10 is a block diagram showing the configuration of an imaging device in accordance with an embodiment of the present disclosure.

FIG. 10 is a block diagram showing the configuration of the imaging device 1 in accordance with an embodiment of the present disclosure. As shown in FIG. 10, the imaging device 1 in accordance with the first embodiment of the present disclosure includes a control unit 10, a shooting unit 30, and a recording/playback processing unit 40.

In addition, the shooting unit (imaging unit) 30 includes the imaging optical unit 31, an optical unit control unit 32, a signal conversion unit 33, an image signal processing unit 34, an audio input unit 35, and an audio signal processing unit 36.

The imaging optical unit 31 includes a lens group for imaging a subject, a diaphragm adjustment mechanism, a focus adjustment mechanism, a zoom mechanism, a shutter mechanism, a flash mechanism, a shake correction mechanism, and the like, and forms an image of the subject at the signal conversion unit 33.

The optical unit control unit 32, upon receiving a control signal from the control unit 10, generates a control signal to be supplied to the imaging optical unit 31. Then, the optical unit control unit 32 supplies the generated control signal to the imaging optical unit 31 and performs control such as zoom control, shutter control, and exposure control.

The signal conversion unit 33 includes, for example, an image sensor such as a CCD or a CMOS as described above. The signal conversion unit 33, when supplied with an image acquisition timing signal from the control unit 10 on the basis of a user's operation on the operation input unit 20, converts an image of the subject, which has been formed on an imaging plane by the imaging optical unit 31, into an electrical image signal, and supplies it to the image signal processing unit 34. In the shooting mode, image acquisition timing signals are continuously supplied from the control unit 10. Thus, the signal conversion unit 33 acquires image signals of a plurality of frames by continuously converting image signals of the subject.

The image signal processing unit 34, on the basis of a control signal from the control unit 10, performs processes such as gamma correction and AGC (Auto Gain Control) on the image signal, and also performs a process of converting the image signal into a digital format.

The audio input unit 35 collects sound around the subject in the shooting mode. The audio input unit 35 converts the collected sound into an electrical audio signal, and supplies it to the audio signal processing unit 36. The audio signal processing unit 36, on the basis of a control signal from the control unit 10, performs processes such as correction or AGC on the audio signal, and also performs a process of converting the audio signal into a digital format.

The recording/playback processing unit 40 includes an encoding/decoding unit 41, a disc interface 42, a storage device 44, an output processing unit 45, and buffer memory 46 as shown in FIG. 10, and functions as a playback unit and a recording unit.

The encoding/decoding unit 41 has an encoding function in which an image signal and an audio signal supplied from the shooting unit 30 and additional recording information such as time information are encoded and multiplexed using a MPEG scheme or the like so that they are converted into compressed data including image data and audio data.

Meanwhile, the encoding/decoding unit 41 also has a decoding function (a playback function) in which image data and audio data are separated from the compressed data so that the image data and the audio data are decoded into an image signal and an audio signal.

In addition, the encoding/decoding unit 41 further performs, on the basis of a control signal from the control unit 10, automatic white balance control, exposure correction control, magnification control in accordance with digital zoom magnification, and the like on the image signal supplied from the image signal processing unit 34.

The disc interface 42 writes the compressed data supplied from the encoding/decoding unit 41 into the storage device 44. In addition, the disc interface 42 reads the compressed data from the storage device 44 and supplies it to the encoding/decoding unit 41. Note that the storage device 44 can be an optical disc such as DVD-R (Digital Versatile Disc Recordable) or BD (Blu-Ray Disc®).

The output processing unit 45 is controlled by the main control unit 100 via a system bus 109. The output processing unit 45 supplies the compressed data supplied from the encoding/decoding unit 41 to the control unit 10 and an editing device 200. Herein, the editing device 200 can be, for example, an information processing device connected to the imaging device 1 via an output terminal of the output processing unit 45. The user is able to edit image data, audio data, or the like using the editing device 200.

The buffer memory 46 includes, for example, SDRAM and is used as a work area for performing encoding or decoding with the encoding/decoding unit 41.

The control unit 10 is configured such that, as shown in FIG. 10, the main control unit 100, ROM (Read Only Memory) 101, RAM (Random Access Memory) 102, an operation input interface 103 that receives an operation input from the operation input unit 20 or from the touch panel 12, a display control unit 104 that controls the touch panel 12, a memory card interface 105 to be loaded with a memory card 14, a clock circuit 106 that generates time information for use in the recording of the shooting time or the like, an angle detection unit 107 that detects the angle of the open/close unit 8 from a signal of an angle sensor 16, and a projector control unit 108 that controls the projector module 18 are connected via the system bus 109.

The main control unit 100 has a configuration that manages the processing of the entire imaging device 1, and uses the RAM 102 as a work area. In addition, the main control unit 100 performs control in accordance with an operation mode specified through a user's operation on the mode operation unit 24.

For example, when the operation mode is the shooting mode, the main control unit 100 stops power supply to the projector control unit 108 and the projector module 18, and causes the touch panel 12 to display an image signal supplied from the image signal processing unit 34 via the display control unit 104.

Meanwhile, when the operation mode is the playback mode, the main control unit 100 stops power supply to the shooting unit 30, and generates the playback screen P or the index screen I on the basis of a playback signal or thumbnails of image data supplied from the encoding/decoding unit 41, and further causes the touch panel 12 to display the playback screen P or the index screen I via the display control unit 104.

In the ROM 101, a program for controlling the shooting unit 30 and a program for executing recording control, playback control, and the like on image signals and audio signals are written.

The operation input interface 103 transmits operation signals from the connected operation input unit 20 and touch panel 12 to the main control unit 100. Note that the zoom operation unit 21, the manual operation unit 22, the still image capturing operation unit 23, the mode operation unit 24, the projection switching operation unit 25, and the like shown in FIG. 1 are collectively referred to as the operation input unit 20.

The display control unit 104 performs control for displaying on the touch panel 12 the image signal supplied from the image signal processing unit 34, the playback screen P or the index screen I generated by the main control unit 100, and the like.

The memory card interface 105 writes the compressed data supplied from the encoding/decoding unit 41 to the memory card 14. In addition, the memory card interface 105 reads the compressed data from the memory card 14 and supplies it to the encoding/decoding unit 41.

The clock circuit 106 generates time information representing the year, month, date, time, hour, minute, second, and the like.

The angle detection unit 107, on the basis of a signal from the angle sensor 16, detects the open/closed state and the rotation state of the open/close unit 8 with respect to the main body 4. The angle sensor 16 can include a set of a magnets provided on the opposite surfaces of the open/close unit 8 and magnetic sensors provided at different positions of the main body 4 corresponding to the positions of the magnets. In this case, the angle detection unit 107 can detect if the open/close unit 8 is in the basic storage state, the flipped storage state, or the open state from a detection result of magnetic fields obtained by each magnetic sensor. Further, the angle detection unit 107 can detect the open/close angle and the rotation angle of the open/close unit 8 with respect to the main body 4.

The projector control unit 108 (projection control unit) performs control for projecting a screen onto a projection screen 3 from the projector module 18. The playback screen P or the index screen I, for example, is projected onto the projection screen 3 from the projector module 18 on the basis of control by the projector control unit 108.

In addition, the projector control unit 108 performs control for stopping projection from the projector module 18 in accordance with the open/closed state and the rotation state of the open/close unit 8 with respect to the main body 4 detected by the angle detection unit 107. Hereinafter, the operation of the imaging device 1 based on such control will be specifically described.

<4. Operation of Imaging Device in Accordance with Embodiment of the Present Disclosure>

(4-1. First Operation Example)

Figure 11:
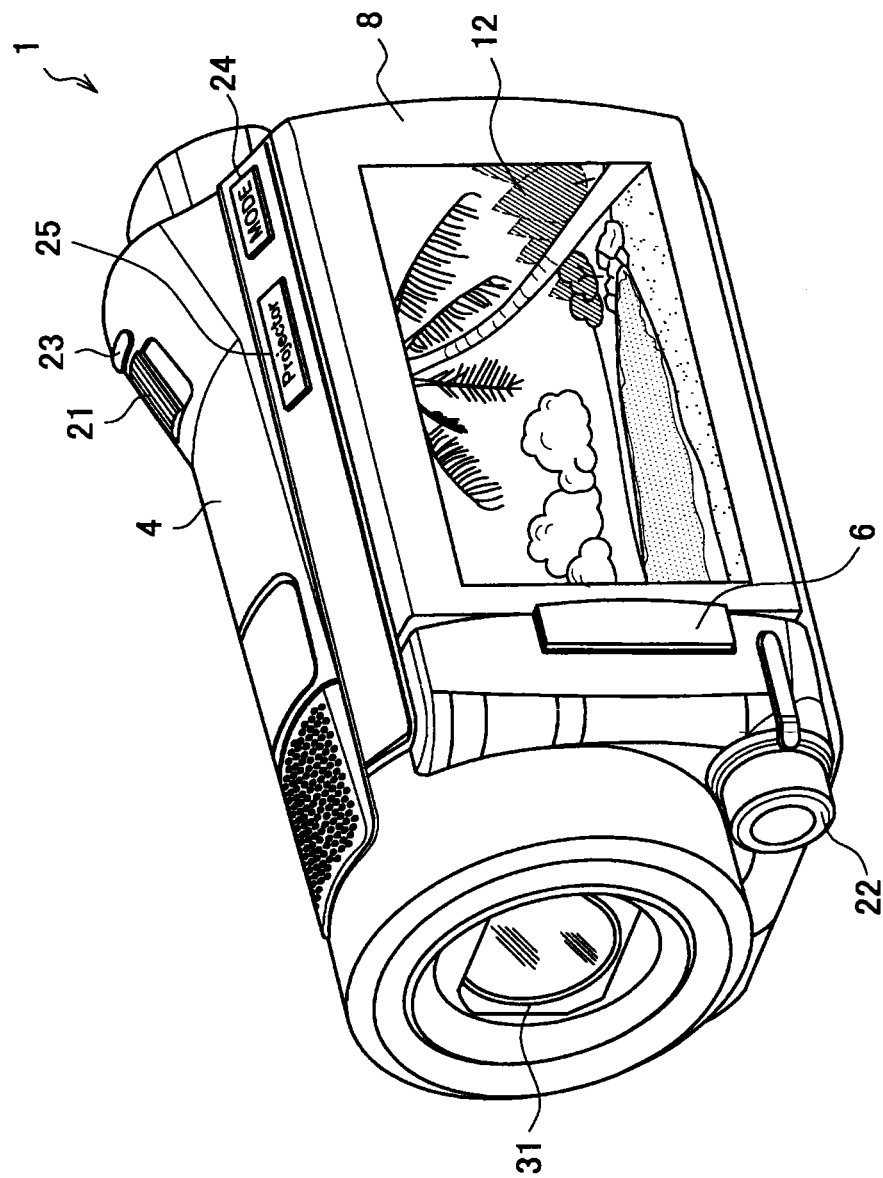
FIG. 11 is an explanatory diagram showing a flipped storage state of the open/close unit.

FIG. 11 is an explanatory diagram showing the flipped storage state of the open/close unit 8. As shown in FIG. 11, in the flipped storage state, the open/close unit 8 is in a state of being closed with respect to the main body 4 such that the projection lens 188 faces inward. When projection is performed in such a flipped storage state, heat generated in the projector module 18 would easily propagate to the main body 4, and projection light would be projected on the main body 4. Thus, the temperature of the imaging optical unit 31 of the main body 4 is predicted to increase. Thus, as the first operation example, the projector control unit 108, when the open/close unit 8 is in the flipped storage state, performs control such that projection is not performed by the projector module 18. Hereinafter, the detailed description thereof will be given with reference to FIG. 12.

Figure 12:
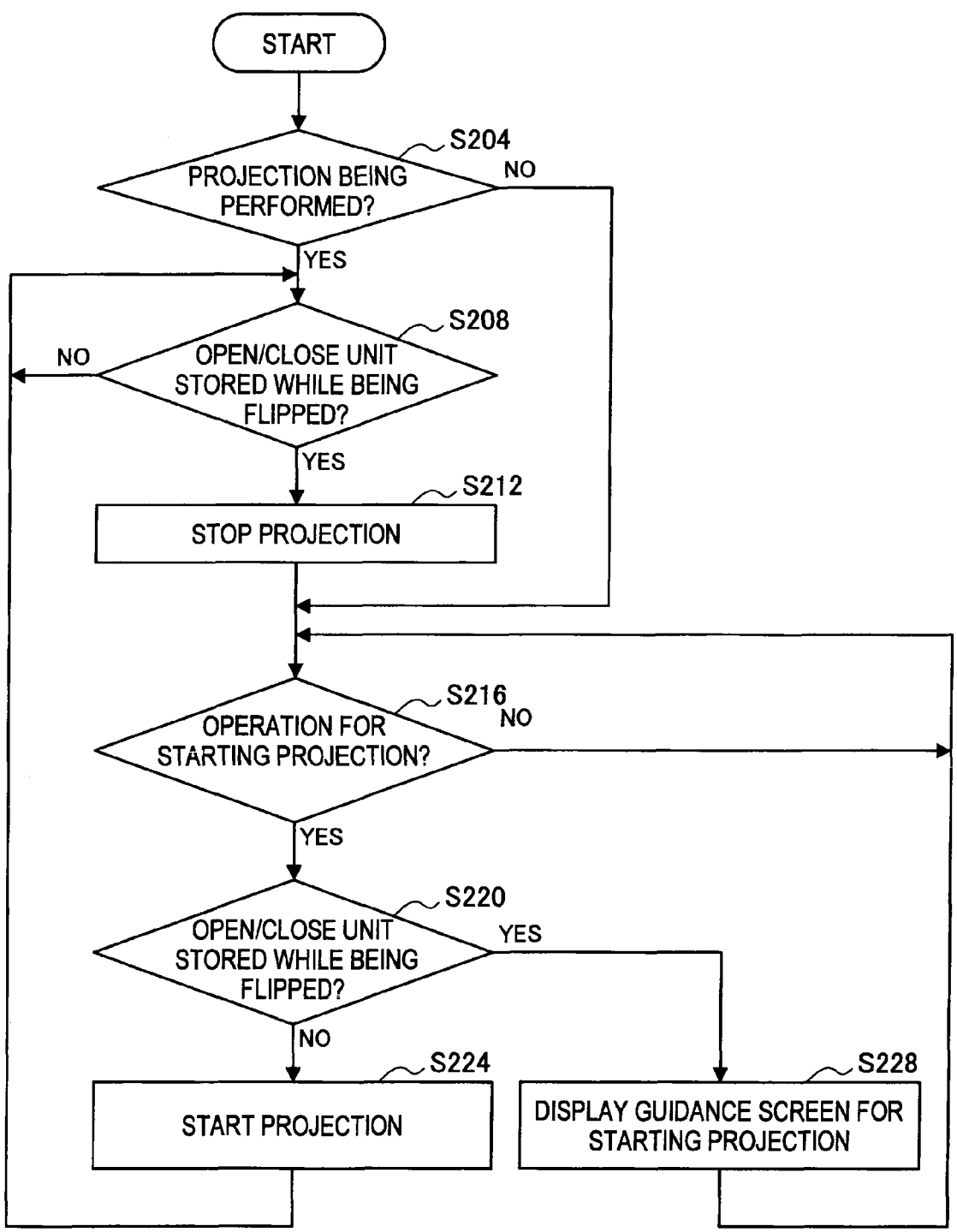
FIG. 12 is a flowchart showing the first operation example in accordance with an embodiment of the present disclosure.

FIG. 12 is a flowchart showing the first operation example in accordance with an embodiment of the present disclosure. As shown in FIG. 12, while the projector module 18 is performing projection (S204), if the angle detection unit 107 has detected that the open/close unit 8 is in the flipped storage state (S208), the projector control unit 108 causes the projector module 18 to stop the projection in accordance with an instruction from the main control unit 100 (S212).

Then, when a user has operated the projection switching operation unit 25 while projection is not performed by the projector module 18 such as after S212 (S216), the projector control unit 108, if the open/close unit 8 is not in the flipped storage state (S220), causes the projector module 18 to start projection (S224).

Meanwhile, the projector control unit 108, if the angle detection unit 107 has detected that the open/close unit 8 is in the flipped storage state (S220), does not cause the projector module 18 to start projection, and the display control unit 104 causes the touch panel 12 to display a guidance screen for starting projection (S228). Examples of the guidance screen for starting projection include a screen that contains the following message: "Open the touch panel" or "Point the projection lens outward." Thereafter, the operations from S216 are repeated.

According to the first operation example described above, it is possible to prevent projection from being performed in the flipped storage state. Thus, a temperature rise of the imaging optical unit 31 of the main body 4 can be suppressed, and imaging can be smoothly started immediately after the termination of projection.

(4-2. Second Operation Example)

Figure 13A:
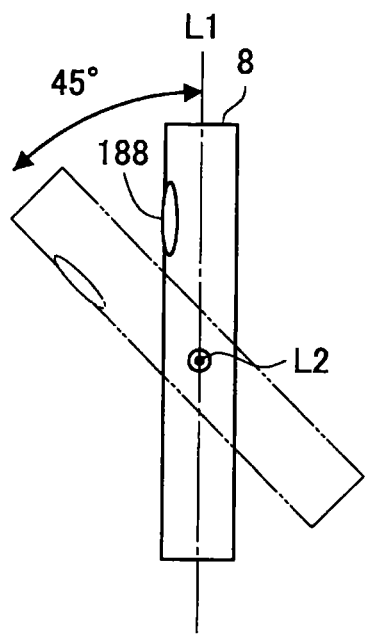
FIG. 13A is an explanatory diagram showing an exemplary range of the rotation angle of the open/close unit with which projection can be performed.
Figure 13B:
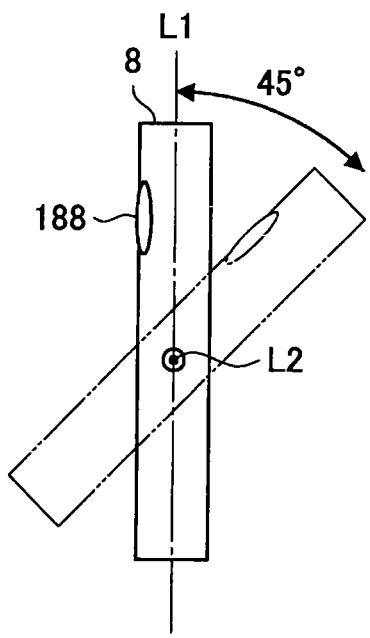
FIG. 13B is an explanatory diagram showing an exemplary range of the rotation angle of the open/close unit with which projection can be performed.

As described with reference to FIGS. 1 and 2 and the like, the projection lens 188 is provided on a surface of the open/close unit 8 opposite to the touch panel 12. Therefore, considering the operability of the touch panel 12 for a user during projection and considering preventing projection from being performed toward the user, it is desired that the open/close unit 8 be, with reference to the state of the open/close unit 8 in which the direction that the projection lens 188 the faces crosses the open/close axis L1 at right angles, within a predetermined range such as zero to 45 degrees in the counterclockwise direction as shown in FIG. 13A and zero to 45 degrees in the clockwise direction as shown in FIG. 13B, for example. Thus, as the second operation example, the projector control unit 108, when the rotation angle of the open/close unit 8 is outside the predetermined range, performs control such that projection is not performed by the projector module 18. Hereinafter, the detailed description thereof will be given with reference to FIG. 14.

Figure 14:
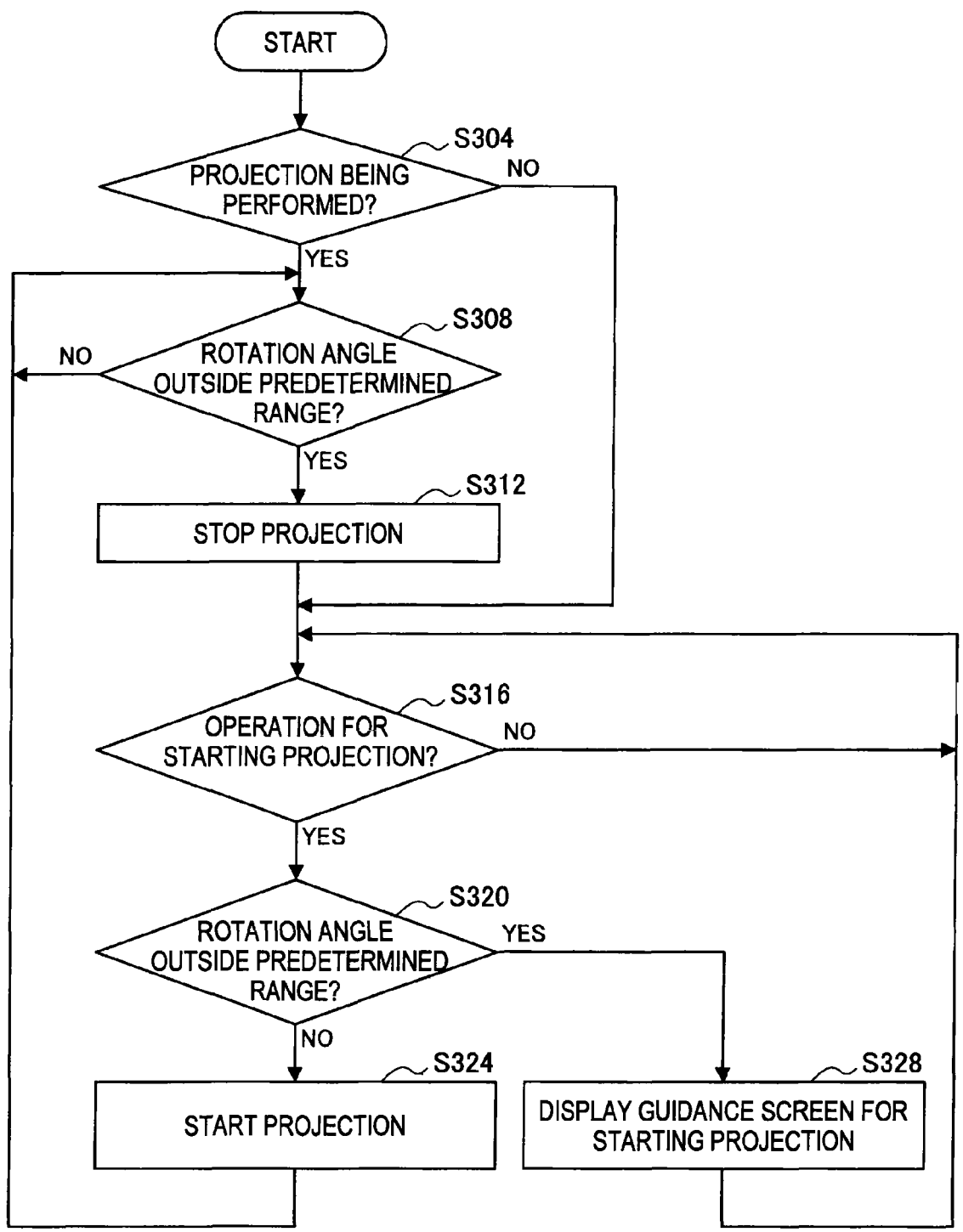
FIG. 14 is a flowchart showing the second operation example in accordance with an embodiment of the present disclosure.

FIG. 14 is a flowchart showing the second operation example in accordance with an embodiment of the present disclosure. As shown in FIG. 14, while the projector module 18 is performing projection (S304), if the angle detection unit 107 has detected that the rotation angle of the open/close unit 8 is outside the predetermined range (S308), the projector control unit 108 causes the projector module 18 to stop the projection (S312).

Then, when a user has operated the projection switching operation unit 25 while projection is not performed by the projector module 18 such as after S312 (S316), the projector control unit 108, if the rotation angle of the open/close unit 8 is not outside the predetermined range (S320), causes the projector module 18 to start projection (S324).

Meanwhile, the projector control unit 108, if the angle detection unit 107 has detected that the rotation angle of the open/close unit 8 is outside the predetermined range (S320), does not cause the projector module 18 to start projection, and the display control unit 104 causes the touch panel 12 to display a guidance screen for starting projection (S328). Examples of the guidance screen for starting projection include a screen that contains the following message: "Point the projection lens in the horizontal direction." Thereafter, the operations from S316 are repeated.

According to the second operation example described above, it is possible to prevent projection from being performed when the rotation angle of the open/close unit 8 is outside the predetermined range. Thus, the operability of the touch panel 12 for a user during projection can be ensured.

<5. Conclusion>

As described above, according to the embodiments of the present disclosure, the projection lens 188 is provided on the open/close unit 8. Thus, the user is able to easily adjust the direction that the projection lens 188 faces, namely, the direction of projection from the projection lens 188 by rotating the open/close unit 8 about the open/close axis L1 or about the rotation axis L2. In addition, as the projector module 18 including the projection lens 188 is indirectly connected to the main body 4 having the imaging optical unit 31 via the hinge mechanism 6, it is possible to suppress the amount of propagation of heat generated in the projector module toward the imaging optical unit 31.

In addition, according to the embodiments of the present disclosure, the projection lens 188 is provided on the upper side of the rotation axis L2 of the open/close unit 8 in the basic storage state. Thus, it is possible to suppress the possibility that the bottom of an image projected onto a wall from the projection lens 188 may be blocked by a desk or a floor. Further, according to the embodiments of the present disclosure, on/off of projection performed by the projector module 18 can be controlled in accordance with the open/closed state or the rotation state of the open/close unit 8 with respect to the main body 4.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, the steps in the process of the imaging device 1 in this specification need not necessarily be processed in a time-series order in accordance with the order described in the flowchart. For example, the steps in the process of the imaging device 1 can be performed in an order different from that described in the flowchart, or be processed in parallel.

It is also possible to create a computer program for causing built-in hardware in the imaging device 1 to exert a function that is equivalent to each configuration of the aforementioned imaging device 1. In addition, a storage medium having the computer program stored therein is also provided.

The present disclosure contains subject matter related to that disclosed in Japanese Priority Patent Application JP 2010-251674 filed in the Japan Patent Office on Nov. 10, 2010, the entire content of which is hereby incorporated by reference.

What is claimed is:

1. A projection device comprising:
a device main body;
an open/close unit connected to the device main body, wherein an entirety of the open/close unit is configured to rotate about each of a first axis and a second axis different from the first axis, the first axis being an open/close axis formed in a vertical direction of the device main body, and the second axis being an axis formed perpendicular to the open/close axis; and
a projection lens included with the open/close unit, wherein the projection lens is, in a closed state in which the open/close unit is closed with respect to the device main body such that the projection lens faces outward, located on an upper side of the rotation axis of the open/close unit.

2. The projection device according to claim 1, wherein the device main body includes
an imaging unit; and
a connecting portion that connects the open/close unit and the device main body, and
the connecting portion is located on a side of a subject in an optical axis direction of the imaging unit.

3. The projection device according to claim 2, wherein the projection lens is provided on a side far from the connecting portion on a direction in which the rotation axis of the open/close unit is formed.

4. The projection device according to claim 3, further comprising a projection unit including the projection lens, wherein the projection unit is configured to, in a state in which the open/close unit is opened without rotation from the closed state, project an image in a direction toward the upper side of the device main body.

5. The projection device according to claim 4, further comprising:
circuitry configured to:
detect a connection state of the open/close unit with respect to the device main body; and
control whether or not to cause the projection unit to project an image in accordance with a detection result obtained by the detection unit.

6. The projection device according to claim 5, further comprising a projection unit, wherein when the circuitry has detected a connection state in which the open/close unit is closed with respect to the device main body such that the projection lens faces inward, the circuitry is further configured to control the projection unit such that the projection unit does not project an image.

7. The projection device according to claim 5, further comprising a projection unit, wherein when the circuitry has detected a connection state in which a rotation angle of the open/close unit is outside a predetermined range, the circuitry is further configured to control the projection unit such that the projection unit does not project an image.

* * * * *